United States Patent [19]

Dmitrovsky et al.

[11] 4,056,364
[45] Nov. 1, 1977

[54] TWO STAGE CONTINUOUS CRYSTALLIZATION APPARATUS WITH CONTROLS

[75] Inventors: Morris Dmitrovsky, Roslyn Heights, N.Y.; Antoine H. Kokke, Rosemont, Pa.

[73] Assignee: Amstar Corporation, New York, N.Y.

[21] Appl. No.: 650,300

[22] Filed: Jan. 19, 1976

Related U.S. Application Data

[62] Division of Ser. No. 501,862, Aug. 30, 1974, Pat. No. 3,981,739.

[51] Int. Cl.$^2$ .............................................. B01D 9/02
[52] U.S. Cl. .................................. 23/273 R; 23/301; 23/295 R; 127/16; 127/60; 159/17 P; 159/44
[58] Field of Search ............... 23/273 R, 295, 301 R; 127/16, 60, 15; 159/17 P, 44, 45, 47 R

[56] References Cited

U.S. PATENT DOCUMENTS

| 2,377,363 | 6/1945 | Noble | 23/273 R |
|---|---|---|---|
| 3,220,883 | 11/1965 | Howard | 127/60 |
| 3,261,670 | 7/1966 | Chirico | 23/273 R |
| 3,530,924 | 9/1970 | Domning | 23/273 R |
| 3,595,624 | 7/1971 | Bradfield | 23/273 R |
| 3,622,387 | 11/1971 | Grandadam | 150/17 P |
| 3,680,621 | 8/1972 | Giorgi | 127/16 |
| 3,725,127 | 4/1973 | Retali | 127/16 |
| 3,899,386 | 8/1975 | Komiyama | 127/60 |
| 3,900,292 | 8/1975 | Fairchild | 23/273 R |

FOREIGN PATENT DOCUMENTS 42-17174  11/1967  Japan .................................. 23/273 R

OTHER PUBLICATIONS

Garrett, Industrial and Engineering Chemistry, vol. 53, No. 8, Aug. 1961, pp. 623–628.

Primary Examiner—Stephen J. Emery
Attorney, Agent, or Firm—Copper, Dunham, Clark, Griffin & Moran

[57] ABSTRACT

A crystallizable solute is crystallized from a solution containing the same by introducing a solution of said solute into a first stage evaporative-crystallization zone together with seed solute crystals. Within the first stage evaporative-crystallization zone the solution is concentrated to yield a saturated first stage concentrate containing crystals of said solute. The crystals of said solute are substantially larger than said seed crystals and are suspended in a solution more concentrated with respect to said solute than the solution supplied to said first evaporative-crystallizaton zone. A stream of said first concentrate is removed from said first evaporative-crystallizaton zone and transferred to a second evaporative-crystallization zone for further concentration or crystallization of solute and for the production of solute crystals of increased size. There is continuously recovered from the second evaporative-crystallization zone a slurry having a total solute or solids content of about 86–94% by weight and containing the solute crystals of desired crystal size.

9 Claims, 1 Drawing Figure

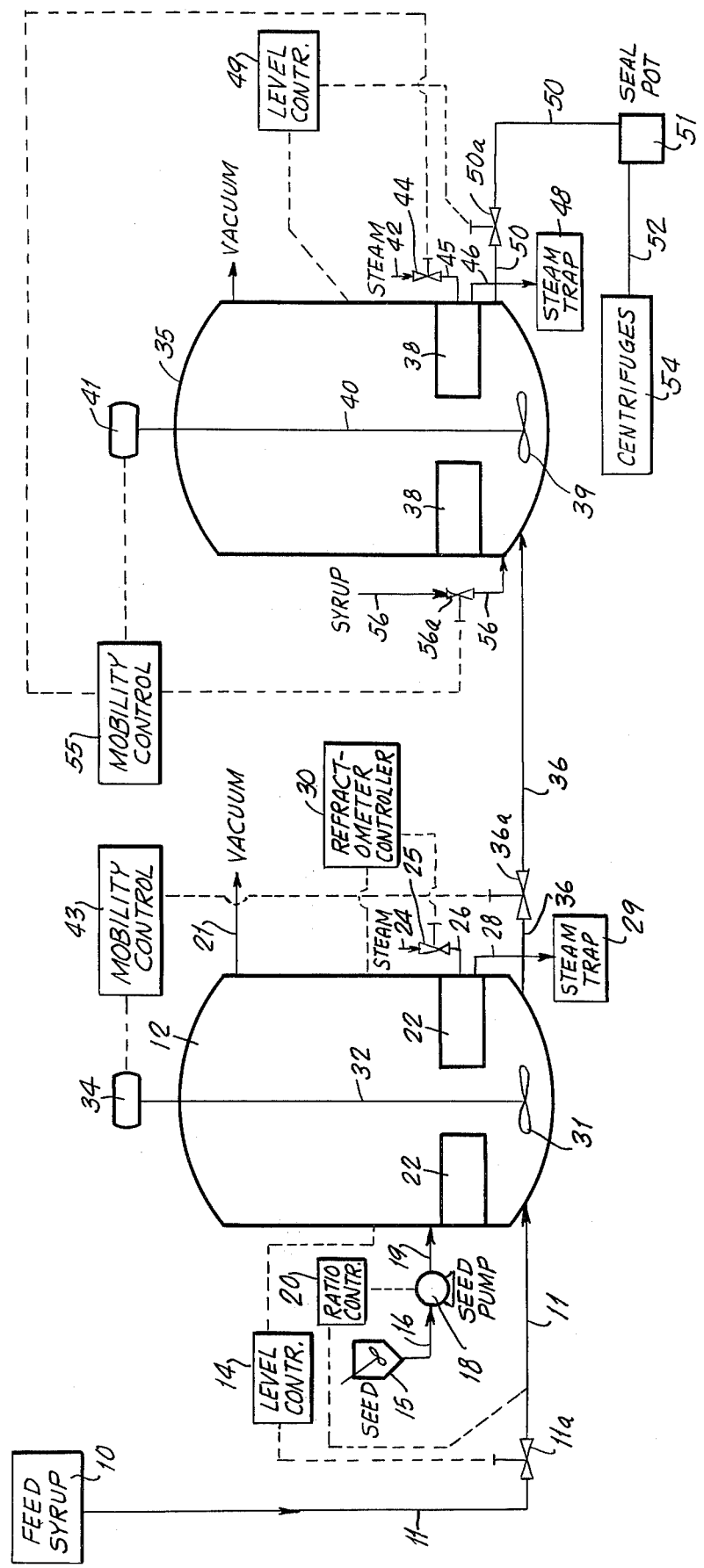

TWO STAGE CONTINUOUS CRYSTALLIZATION APPARATUS WITH CONTROLS

This is a division of application Ser. No. 501,862 filed Aug. 30, 1974 now U.S. Pat. No. 3,981,739.

This invention relates to the crystallization of a crystallizable solute from a solution thereof. In one aspect, this invention relates to a process for continuous crystallization. In another aspect, this invention relates to an apparatus useful for carrying out a continuous crystallization operation.

In one embodiment, this invention is particularly applicable to the continuous crystallization of a highly water-soluble crystallizable solute, particularly a solute capable of forming solutions having a fairly high degree of supersaturation, such as sugar (sucrose), from a solution thereof, such as an aqueous solution. Another embodiment of this invention is particularly applicable to apparatus, specifically a multi-stage, such as a two stage, evaporative-crystallizer, useful for the continuous crystallization of a highly water-soluble crystallizable solute, such as sugar (sucrose), from a water solution thereof.

Various techniques and apparatus have been developed for carrying out the continuous crystallization of highly water-soluble solutes, such as sugar, from a water solution thereof, see U.S. Pat. Nos. 1,273,058, 1,724,627, 2,160,533, 2,587,293, 2,743,198, 3,247,021, 3,424,221, 3,503,803, 3,506,486, 3,627,582 and 3,680,621.

For the most part, however, the techniques, processes and apparatus proposed heretofore have not been completely satisfactory. Previously proposed schemes and apparatus have been difficult and expensive to operate on a commercial basis.

It is an object of this invention to provide a process for the continuous crystallization of a water-soluble crystallizable solute from an aqueous solution thereof.

It is another object of this invention to provide apparatus for effecting the continuous crystallization of a crystallizable solute from a water solution thereof.

It is still another object of this invention to provide a process for the continuous crystallization of sugar from an aqueous solution or syrup.

It is still another object of this invention to provide an apparatus useful for the continuous crystallization of sugar from an aqueous solution or syrup thereof.

How these and other objects of this invention are achieved will become apparent in the light of the accompanying disclosure and with reference to the accompanying drawing wherein there is schematically illustrated an apparatus and flow scheme in accordance with this invention particularly applicable for the continuous crystallization of sugar (sucrose) from an aqueous solution thereof. In at least one embodiment of the practice of this invention at least one of the foregoing objects will be achieved.

In accordance with this invention, in the process embodiment thereof, substantially continuous crystallization of a solute, such as a readily water-soluble solute, from a solution thereof, such as an aqueous solution, is accomplished by introducing the aqueous solution containing the crystallizable solute dissolved therein into a first stage evaporative-crystallization zone. There is also introduced into the first stage evaporative-crystallization zone seed crystals, such as a slurry of seed crystals, of a small crystal size to serve as sites for the crystallization of the solute thereon. Within the first stage evaporative-crystalization zone, the solution substantially continuously supplied thereto along with the solute seed crystals is continuously concentrated, such as by removal of solvent therefrom, and at the same time crystallization of the solute upon the seed crystals takes place with resulting enlargement or increase in size of the solute seed crystals. There is substantially continuously removed from the first stage evaporative-crystallization zone a stream containing the crystals of solute of increased size along with a saturated solution or first mother liquor, now having an increased concentration of dissolved solute therein relative to the feed solution supplied to the first evaporative-crystallization zone. This stream removed from the first stage evaporative-crystallization zone is substantially continuously supplied to a second stage evaporative-crystallization zone wherein further removal of the solvent therein takes place with an additional increase in the size of the solute crystals. There is continuously removed from the second evaporative-crystallization zone a product stream containing solute crystals of desired size in a second mother liquor, the product stream having a total solute or solids content or concentration substantially greater than the stream withdrawn from the first stage evaporative-crystallization zone, such as a solute or solids content or concentration in the range 86-94% by weight.

The aforesaid operations in accordance with this invention are particularly applicable to the continuous processing of a sugar syrup for the substantial continuous production therefrom of sugar crystals of a desired product size.

In an apparatus embodiment of the subject invention, there are employed in combination a first stage vacuum evaporative-crystallization zone and a second stage vacuum evaporative-crystallization zone. Desirably, both evaporative-crystallization zones are provided with suitable mixing means, such as an agitator, for the mixing of the fluid contents thereof. Associated with the first stage evaporative-crystallization zone, in addition to means for producing a vacuum or reduced pressure therein, are heat exchange means, preferably suitably located in or near the bottom thereof, together with means for supplying the heating fluid thereto and associated conduit and control devices for assuring the substantially continuous operation of the first stage evaporative-crystallization zone for increasing the size of solute seed crystals supplied thereto and for the removal of solvent evaporated from the solute feed solution supplied to the first stage evaporative-crystallization zone, for resulting increase of the concentration of the dissolved solute in the solution undergoing processing therein. Associated with the second stage evaporative-crystallization zone is a heat exchanger, also preferably located in or near the bottom thereof, for heating the contents thereof and which is supplied with a heating fluid, such as steam. The contents of the second stage evaporative-crystallization zone are supplied thereto from the first stage-evaporative-crystallization zone through suitable conduit means and associated control equipment. Means are provided associated with the second vacuum evaporative-crystallization zone for the continuous withdrawal of a stream therefrom containing solute crystals of desired crystal size which would then be treated, such as by filtration or centrifugation, for the recovery of the solute crystals as product.

As indicated hereinabove with respect to the process embodiment of this invention, the apparatus embodiment described hereinabove is particularly applicable for the continuous crystallization of sugar from a sugar syrup.

Reference is now made to the drawing which schematically illustrates a preferred embodiment of the practice of this invention in both apparatus and process form for the continuous crystallization of sugar (sucrose) from a sugar solution or syrup.

As illustrated therein, a sugar feed syrup, such as, and preferably, a refined sugar syrup of substantially 100% purity and analyzing about 50–75%, e.g. about 62–69% by weight dissolved sugar, such as about 66%, is supplied from a suitable source 10 via line 11 to first stage vacuum evaporator-crystallizer 12. The substantially continuous flow of sugar syrup from source 10 via line 11 into evaporator-crystallizer 12 is controlled by flow controller or automatic liquid supply valve 11a in line 11. The operation of flow controller or supply valve 11a is controlled by level controller 14 responsive to the level of sugar syrup within evaporator-crystallizer 12.

Level controller 14 is conveniently set, such as at a level of about 50% of the volumetric capacity of evaporator-crystallizer 12. Seed crystals, such as a slurry of sugar seed crystals prepared from powdered sugar having an average crystal size in the range about 5–50 or 60–100 microns, e.g. 6× confectioners sugar in a saturated sugar syrup made up in tank 15, are supplied via line 16, pump 18 and line 19 to evaporator-crystallizer 12 for admixture with feed syrup supplied thereto via line 11. The amount of sugar seed crystals supplied to evaporator-crystallizer 12 is proportioned to the amount of feed syrup supplied to evaporator-crystallizer 12 by ratio controller 20 which operates pump 18 to supply sugar seed crystals to evaporator-crystallizer 12. Pump 18 is actuated by ratio controller 20 which senses and is responsive to the flow of syrup in line 11.

As illustrated, a vacuum, such as about 3–15 inches Hg absolute, e.g. 5–6 inches Hg, is provided within evaporator-crystallizer 12 via line 21 which is connected to a suitable device or means, such as a barometric condenser, for producing a reduced pressure or vacuum within evaporator-crystallizer 12.

Evaporator-crystallizer 12 is also provided with heating means 22, such as heating coils, positioned in the lower portion thereof. Heating means 22 is supplied with heating fluid, such as steam, via line 24, steam flow control valve 25 and line 26. The condensed steam from heating means 22 is removed via line 28 and steam trap 29. The flow of steam or heating fluid via flow control valve 25 into heat exchanger or heating means 22 for heating the contents of evaporator-crystallizer 12 is usefully manually controlled but is preferably responsive by suitable means to the concentration of dissolved sugar in the liquid or syrup within evaporator-crystallizer 12. For example, as illustrated, flow control valve 25 is responsive to and is controlled by means of refractometer controller 30 which determines the sugar content in the syrup undergoing concentration and crystallization in evaporator-crystallizer 12. Conveniently, the steam supplied to heating means 22 within evaporator-crystallizer 12 is low pressure steam, about 3–15 psig, e.g. 7 psig. If desired, as indicated hereinabove, the supply of steam to heating means 22 can be manually set and, if desired, ratio controller 20 for the supply of solute seed crystals relative to the feed syrup to evaporator-crystallizer 12 can be set at a fixed metered setting or automatically varied or adjusted.

Further, as illustrated, agitator 31, such as a bladed agitator, turned by shaft 32 which is operatively connected to motor 34 is associated with evaporator-crystallizer 12 to promote the evaporative-crystallization of the sugar in the sugar syrup supplied to evaporator-crystallizer 12 via feed sugar syrup supply line 11.

Evaporator-crystallizer 12 is operated so as to produce a sugar saturated syrup, such as a syrup having a dissolved sugar concentration of about 77–80% by weight and having suspended therein sugar crystals in an amount up to about 25% by weight, such as in the range 5–20%, e.g. 10% by weight, of the concentrated sugar syrup therein, the sugar crystals having an average crystal size in the range about 150–200 microns. When evaporator-crystallizer 12 is operated under the above-indicated conditions, such as to produce a mother liquor having a dissolved sugar concentration of about 77–89% by weight sugar, the temperature of the syrup within evaporator-crystallizer 12 is in the range about 130–200° F., such as about 150–160° F.

In the operation of evaporator-crystallizer 12, it is desirable to maintain the relationship of the motor liquor and sugar crystals such that the sugar crystals comprise up to about 25%, such as 5 to about 15–20% by weight of the total contents of evaporator-crystallizer 12. This is accomplished by controlling the hold-up time of the materials introduced into evaporator-crystallizer 12, the amount and/or rate of sugar seed crystals introduced thereinto and the degree of supersaturation of the syrup or mother liquor within evaporator-crystallizer 12. The hold-up or retention time within evaporator-crystallizer 12 can be controlled by suitable instrumentation, such as by a viscometer or light scattering device or other suitable device which senses undissolved solids. Such devices can be used, as illustrated in the drawing and described hereinafter, to control the withdrawal of the fluid contents from evaporator-crystallizer 12.

The withdrawal and transfer of fluid contents or syrup containing sugar crystals therein from evaporator-crystallizer 12 to evaporator-crystallizer 35 is effected via line 36 provided with flow control valve 36a therein. As illustrated, the syrup containing sugar crystals suspended therein is directly, and without any intervening treatment, transferred from evaporator-crystallizer 12 to second stage evaporator-crystallizer 35. To aid in the transfer of the fluid contents or syrup from evaporator-crystallizer 12 to evaporator-crystallizer 35, a differential pressure of at least about 1 inch Hg is desirably maintained therebetween, with the higher pressure in evaporator-crystallizer 12 relative to evaporator-crystallizer 35. For example, with evaporator-crystallizer 12 operating at a vacuum of about 5–6 inches Hg absolute, evaporator-crystallizer 35 could be operated at an absolute pressure of about 4–5 inches Hg, a pressure differential in the range about 1–2 inches Hg.

In second stage evaporator-crystallizer 35, the syrup introduced thereinto via line 36 undergoes further concentration by solvent (water) removal and the sugar crystals are further increased in size from about 150–200 microns to about an average crystal size in the range 325–425 microns. Evaporator-crystallizer 35 is provided with heating means 38, such as heating coil, as well as agitator 39, such as a bladed agitator, mounted on shaft 40 operated by motor 41. Heating fluid, such as low pressure steam, is supplied to heating means 38 via line 42, flow control valve 44 and line 45. The flow of steam through flow control valve 44, if desired, may be actuated and controlled by a suitable device for sensing and determining the total solids content in the syrup within evaporator-crystallizer 35. Condensate or condensed steam is withdrawn from heating means 38 via line 46 and steam trap 48.

The fluid content second stage evaporator-crystallizer 35 tends to be thick and viscous and of massecuite consistency, which is desirable for the proper operation of the centrifuges used for the separation of sugar crystals from the mother liquor.

Level controller 49 responsive to the liquid level within evaporator-crystallizer 35 serves to control the discharge of syrup from evaporator-crystallizer 35 via line 50 and flow control valve 50a therein for transfer of the sugar crystal-loaded syrup from evaporator-crystallizer 35 to seal pot 51, for eventual transfer via line 52 to centrifuges 54 for separation of the sugar crystals, as product, from the mother liquor. Desirably, liquid level controller 49 operates to maintain the liquid level of the syrup in evaporator-crystallizer 35 at a suitable level, such as about 45% of the volumetric capacity of evaporator-crystallizer 35.

In the operation of evaporator-crystallizer 35 to obtain the desired massecuite consistency, the supersaturation of the mother liquor therein is maintained only slightly above 1.0 whereas in the operation of evaporator-crystallizer 12, the percent dissolved solids is maintained such that the super-saturation is about 1.2, more or less. Within evaporator-crystallizer 35, substantially little, if any, nucleation takes place, the crystallization occurring therein serving primarily to increase the size of the crystals supplied thereto from evaporator-crystallizer 12 via line 36. On the other hand, within evaporator-crystallizer 12, conditions are maintained to accomplish crystal growth of the seed crystals supplied thereto or controlled nucleation, if desired.

In the operation of evaporator-crystallizer 35, as indicated, it is desirable that the material therein be of massecuite consistency with a total solids (dissolved and undissolved) content in the range about 86-94%, such as in the range about 89-92% by weight. In attaining this desired massecuite consistency for the syrup within evaporator-crystallizer 35, viscosity or mobility controller 43, sensing the torque exerted by motor 34 or the power necessary to operate motor 34 associated with evaporator-crystallizer 12, operates flow control valve 36a for the controlled transfer of syrup from evaporator-crystallizer 12 via line 36 to evaporator-crystallizer 35. Viscosity or mobility controller 55, sensing the torque exerted by motor 41 or the power required to operate motor 41, operates flow control valve 44 for the controlled supply of steam via line 45 to heater 38 of evaporator-crystallizer 35. Mobility controller 55 also serves to supply, if required or desired, additional feed syrup via line 56 through associated flow control valve 56a, into evaporator-crystallizer 35. The feed sugar syrup thus supplied via line 56 serves to effectively provide the desired massecuite consistency for the material undergoing processing in evaporator-crystallizer 35.

In the operation of the process and apparatus described hereinabove with reference to the drawing for the continuous crystallization of sugar from a feed sugar syrup, on the basis of a feed sugar syrup input at a rate of 53.6 cubic feet per minute having 66% by weight solids and 100% purity, together with about 300-400 pounds per hour of confectioners sugar slurry made up with saturated sugar syrup such that the resulting sugar slurry measures approximately 80-82% by weight solds, and with an equal hold-up volume of 1000 cubic feet in each stage, i.e. in evaporator-crystallizer 12 and in evaporator-crystallizer 35, no sugar feed liquor bypassed to the second stage of evaporator-crystallizer 35, the output of evaporator-crystallizer 12 would be about 41.4 cubic feet per minute syrup analyzing 80% by weights solids and at 100% purity. The hold-up time of the materials within evaporator-crystallizer 12 would be about 24 minutes.

This output from evaporator-crystallizer 12 serves as input to the second stage evaporator-crystallizer 35 which, in turn, would yield a massecuite output of about 35.7 cubic feet per minute analyzing about 80% by weight solids at about 100% purity. This would yield an output of about 87,500 pounds of sugar per hour or 43.8 tons of sugar per hour. The hold-up time of the materials introduced into evaporator-crystallizer 35 would be about 28 minutes. The differences in volumetric rate, cubic feet per minute, of the materials undergoing continuous processing and issuing from evaporator-crystallizer 12 and from evaporator-crystallizer 35 is due to the evaporation of water taking place during the operation of evaporator-crystallizer 12 and evaporator-crystallizer 35. If desired, higher or lower throughput rates can be accomplished depending upon temperatures and pressures employed within evaporator-crystallizers 12 and 35, the size of the equipment and the physical properties desired in the product massecuite withdrawn from the last stage, i.e., evaporator-crystallizer 35.

Although the practice of this invention is described in its preferred embodiment in both process and apparatus as directed to the production of sugar, the invention is broadly applicable to the continuous crystallization and recovery of a crystallizable solute from solutions thereof. Crystallizable solutes which are capable of being continuously crystallized and recovered in accordance with the practices of this invention include not only sugar but also related materials and sugars, such as dextrose (glucose) and levulose (fructose), lactose as well as other organic compounds and carbohydrates, e.g. $C_4$-$C_{24}$ carbohydrates, urea and inorganic compounds, particularly the alkali metal and alkaline earth metal salts of organic acids, particularly the carboxylic acids, such as the acetates, lactates, citrates, succinates, but also the inorganic acids, such as the chlorides, sulfates and phosphates.

In the description of a preferred embodiment of the practices of this invention as applied to the continuous crystallization of sugar and as illustrated in the accompanying drawing, a two stage continuous crystallization operation is described. In the practices of this invention, more than two stages may be employed and, in some instances, may be preferable. The practices of this invention accordingly are applicable to a multi-stage continuous crystallization which may employ up to five to eight stages, more or less. Although plural stage continuous crystallization, i.e. more than two stages, would require greater investment in equipment, greater flexibility and control in the overall operation would be possible. Such greater flexibility and control, although not necessary for one type of product, might be necessary or desirable in connection with the production of other products. As will be apparent to those skilled in the art in the light of the foregoing disclosures, many modifications, alterations and substitutions are possible in the practice of this invention without departing from the spirit or scope thereof.

We claim:

1. An apparatus for the continuous crystallization of a crystallizable solute from a feed solution thereof comprising in combination a first stage crystallization zone, a second stage crystallization zone, said first stage crystallization zone and said second stage crystallization zone each being provided with fluid agitating means, first feed solution conduit means for supplying said feed solution to said first stage crystallization zone, first transfer conduit means for the transfer of fluid from said first stage crystallization zone to said second stage crystallization zone, first flow control means associated with said first transfer conduit means for controlling the flow of fluid therein from said first crystallization zone to said second crystallization zone, said first flow control means being controlled by means for measuring the total solute concentration of the fluid contents undergoing processing within said second stage crystallization zone, means for introduction of solute seed crystals to said first crystallization zone, second flow control means associated with said means for introduction of said solute seed crystals for controlling the introduction of solute seed crystals to said first crystallization zone, said second flow control means being responsive to the feed solution introduced to said first crystallization zone, said second flow control means comprising a ratio controller controlling the proportion of solute seed crystals introduced into said first stage crystallization zone relative to the feed solution supplied to said first crystallization zone means for heating the fluid contents of said first stage and said second stage crystallization zones, said means for heating being provided within said first stage and said second stage crystallization zones, respectively, said means for heating of the contents of said first stage crystallization zone being controlled by means measuring the concentration of dissolved solids in the fluid within said first stage crystallization zone, said means for heating of the contents of said second stage crystallization being controlled by means measuring the total solute concentration of the fluid contents within said second stage crystallization zone, third transfer conduit means for the withdrawal of fluid from said second stage crystallization zone, third flow control means associated with said third transfer conduit means for control of fluid withdrawn from said second stage crystallization zone, said third flow control means being responsive to the fluid level within the second stage crystallization zone means for producing a reduced pressure within said first stage and within said second stage crystallization zones, second feed solution conduit means for supplying additional feed solution to said second stage crystallization zone, fourth flow control means responsive to the total solute concentration of the fluid contents undergoing processing within said second stage crystallization zone for controlling the flow of feed solution to said second crystallization zone.

2. Apparatus in accordance with claim 1 wherein said means for measuring the concentration of dissolved solids comprises a viscosimeter.

3. Apparatus in accordance with claim 1 wherein said means for measuring the concentration of dissolved solids comprises a refractometer.

4. Apparatus in accordance with claim 1 wherein said means for measuring the concentration of dissolved solids comprises means for measuring the electrical conductivity of the liquid within said first stage crystallization zone.

5. Apparatus in accordance with claim 1 wherein said first flow control means is responsive to the viscosity of the fluid contents undergoing processing in said second stage crystallization zone.

6. Apparatus in accordance with claim 1 wherein said fourth flow control means is responsive to the viscosity of the fluid contents undergoing processing within said second stage crystallization zone.

7. Apparatus in accordance with claim 1 wherein said first flow control means and said fourth flow control means are responsive to the viscosity of the fluid contents undergoing processing within said second stage crystallization zone.

8. Apparatus in accordance with claim 1 wherein said means responsive to the dissolved solute concentration of the fluid contents within said first stage crystallization zone comprises a refractometer.

9. Apparatus in accordance with claim 1 wherein said means responsive to the total solute concentration of the fluid contents within said second stage crystallization zone comprises a viscosimeter.

* * * * *

UNITED STATES PATENT AND TRADEMARK OFFICE
CERTIFICATE OF CORRECTION

PATENT NO. : 4,056,364
DATED : November 1, 1977
INVENTOR(S) : Morris Dmitrovsky and Antoine H. Kokke It is certified that error appears in the above-identified patent and that said Letters Patent are hereby corrected as shown below:

Column 3, line 8, the paragraph beginning "As illustrated..." should not be a paragraph Column 3, line 10, "62-69%" should read -- 63-69% --

Column 4, line 16, "77-89%" should read -- 77-80% --

Column 4, line 20, "motor" should read -- mother --

Column 6, line 12, "80%" should read -- 89% --

Column 6, line 63, "As will be apparent...." should be a paragraph

Column 7, line 29, after "zone" a comma -- , -- should be inserted

Column 8, line 3, after "zone" a comma -- , -- should be

Signed and Sealed this

Fifteenth Day of August 1978

[SEAL]

Attest:

RUTH C. MASON
Attesting Officer

DONALD W. BANNER
Commissioner of Patents and Trademarks